US005924598A

United States Patent [19]

Bradshaw

[11] Patent Number: 5,924,598

[45] Date of Patent: Jul. 20, 1999

[54] DRYWALL MUD STORAGE AND DISTRIBUTION SYSTEM

[76] Inventor: Larry R. Bradshaw, 18196 Baruch Dr., Ft. Myers, Fla. 33912-6115

[21] Appl. No.: 08/957,279

[22] Filed: Oct. 24, 1997

[51] Int. Cl.$^{6}$ .......... G01F 5/42

[52] U.S. Cl. .......... 222/63; 222/608; 222/185.1; 401/5

[58] Field of Search .......... 222/61, 63, 399, 222/386.5, 185.1, 608; 156/575; 401/5, 48, 146

[56] References Cited

U.S. PATENT DOCUMENTS

| | | | |
|---|---|---|---|
| 1,902,750 | 3/1933 | Barks | 222/56 |
| 1,969,254 | 8/1934 | Bizzarri | 222/56 |
| 2,007,113 | 7/1935 | Staples | 222/56 |
| 2,149,127 | 2/1939 | Tear | 222/56 |
| 2,533,428 | 12/1950 | Carpenter | 103/5 |
| 2,815,142 | 12/1957 | Ames . | |
| 3,707,427 | 12/1972 | Ericson . | |
| 3,931,834 | 1/1976 | Caillet | 138/30 |
| 4,003,781 | 1/1977 | Holsten | 156/526 |
| 4,080,240 | 3/1978 | Dysart | 156/575 |
| 4,109,831 | 8/1978 | Culpepper | 222/254 |
| 4,652,331 | 3/1987 | Plasencia | 156/526 |
| 5,230,608 | 7/1993 | Januska | 156/575 |
| 5,568,882 | 10/1996 | Takacs | 222/61 |
| 5,797,520 | 8/1998 | Donahue | 222/399 |

FOREIGN PATENT DOCUMENTS

| | | |
|---|---|---|
| 2548672 | 9/1976 | Germany . |
| 2098667 | 11/1982 | United Kingdom . |

*Primary Examiner*—Steven O. Douglas
*Attorney, Agent, or Firm*—John M. Harrison

[57] ABSTRACT

A drywall mud storage and distribution system which includes in a preferred embodiment, a mud container and pump mounted on a portable frame, a flexible mud conduit connecting the pump to a portable pressure tank for dispensing drywall mud to the pressure tank, and a second conduit leading from the pressure tank for dispensing the drywall mud through a pressure-sensitive valve, typically to a trigger-operated tape and mud dispensing device. An additional conduit fitted with a handle-operated valve leads from the pressure tank to supply drywall mud to a mud dispensing tray. The system is capable of automatically filling the pressure tank with drywall mud from the mud container by operation of the pump when a preselected pressure is reached in the pressure tank, and drywall mud of selected consistency is supplied in selected quantities on demand, to either the tape and mud dispensing device or the mud dispensing tray or both.

27 Claims, 2 Drawing Sheets

DRYWALL MUD STORAGE AND DISTRIBUTION SYSTEM

BACKGROUND OF THE INVENTION

1. Field of the Invention

This invention relates to the storage, dispensing and use of joint compound, or drywall mud, in building applications and more particularly, to a drywall mud storage and distribution system which is characterized in a first embodiment by a drywall mud container and a pump mounted on a portable frame, with a flexible conduit connecting the pump to a portable pressure tank. A second conduit leads from the pressure tank for dispensing drywall mud through a pressure-sensitive lower valve to a trigger-operated tape and mud dispensing device or the like, on demand. An additional conduit system includes a handle-operated upper valve for selectively dispensing drywall mud from the pressure tank to a mud dispensing tray. The pressure tank is fitted with an internal diaphragm and a pressure switch to facilitate periodic resupply of drywall mud from the mud container into the lower portion or chamber of the pressure tank, and then through the upper and lower valves and conduits to the tape and mud dispensing device and mud dispensing tray, on demand. In a preferred embodiment of the invention the portable frame carrying the mud container is mounted on wheels for efficient portability and the drywall mud is supplied to the pressure tank from the mud container by operation of a positive displacement or progressive cavity pump, which is typically operated by an electric motor and gearbox.

A costly problem in the mixing and dispensing of drywall mud in building applications is maintaining the drywall mud at a desired consistency over a long period of time during an extensive "taping and floating" operation. Powdered drywall compound is typically mixed with water to form the desired drywall mud slurry, which must be prepared in a selected consistency for proper application to the walls and ceiling of a structure. If the drywall mud is too "stiff", it will not flow properly and proper application is rendered difficult or impossible. However, if the water content of the drywall mud is excessive, the mud will flow from the ceiling and walls and cannot therefore be properly applied. Furthermore, as time progresses, even if the drywall mud is initially mixed to a desired consistency, the water content decreases through evaporation and the mud has a tendency to stiffen, thereby rendering proper and uniform application difficult or impossible.

2. Description of the Prior Art

Various types of drywall mud containing and dispensing apparatus are known in the art. Typical of these devices is the "Self-Contained Drywall Taper" detailed in U.S. Pat. No. 2,815,142, dated Dec. 3, 1957, to R. G. Ames. The device includes a tubular tape application apparatus which is fitted with a mud-containing chamber, a rotatable roll of tape and a dispensing head for applying the tape in a constant motion and applying mud on top of the tape. U.S. Pat. No. 3,707,427, dated Dec. 26, 1972, to E. J. Erickson, details a "Dispensing Gun For Wallboard Tape and Joint Compound". The dispensing gun includes a hand-held apparatus having a dispensing chamber, through which wallboard tape is passed from a tape roll. The tape enters an inlet opening in the chamber and passes through the inlet opening to an outlet opening which is associated with a tear-off blade, so that the operator may apply pressure through the hand-held unit to the blade, in order to properly apply tape to the wallboard. The dispensing chamber contains a quantity of compound, over which the wallboard-contacting side of the tape passes. A "Taping Gun" is detailed in U.S. Pat. No. 4,003,781, dated Jan. 18, 1977, to Roger W. Holsten. The taping gun or tool is designed to dispense tape for drywall and includes a handle-like support device having a container mounted thereon and adapted to receive cement material therein. The container is provided with first and second tape openings and a roll of tape is rotatably mounted on the support and extends through the first tape opening and along the interior surface of the tool. The first roller is rotatably mounted on the forward end of the container and is adapted to receive the tape to applying the tape with cement to the drywall. A tape cutter assembly is pivotally mounted on the forward end of the container and is movable from the tape cutting position to a non-cutting position. A spring is operatively connected to the tape cutter assembly for maintaining the assembly in its cutting position. U.S. Pat. No. 4,080,240, dated Mar. 21, 1978, to Norman A. Dysart, details a "Coded Tape Applicator for Dry Walls". The applicator is designed for dispensing a tape coated with an adhesive compound onto a drywall and particularly, along the abutting margins of the drywall panels. The applicator includes a housing containing a reel from which the tape is dispensed and a chamber through which the tape passes. The chamber is fitted with a distributor nozzle which applies a drywall compound to the tape and the housing carries a set of applicator wheels, over which the tape passes as the wheels press the tape flat against the abutting margins of the coplanar panels. A "Dry Wall Taping Machine Having An Improved Applicator Head" is detailed in U.S. Pat. No. 4,208,239, dated Jun. 17, 1980, to Harold M. Lass. The device is hand-operated and includes a tubular body designed for holding by the operator, with a tape applicator head portion at one end. The tool is supplied with drywall tape cement from a supply under pressure and a supply of drywall tape is carried from the main body of the applicator. The tape is fed through the applicator head onto the wall joint to be taped. In the applicator head, a pair of tape drive wheel portions engage the tape and press it against the wall for taping a seam between the two adjacent sections of drywall. Another "Tape Applicator" is detailed in U.S. Pat. No. 4,652,331, dated Mar. 24, 1987, to Richard Plasencia. The applicator includes an adhesive-dispensing nozzle adapted to be mounted on a caulking gun and an applicator roll is mounted adjacent the applicator nozzle. The nozzle is provided with an opening adjacent an inlet for receiving a tape for passage through the nozzle from the opening to the nozzle outlet, wherein the adhesive is applied to one side of the tape. The nozzle has a spring-biased, adjustable gate member to control application of the adhesive and to act as a pressure relief valve if the pressure in the caulking gun becomes too great.

It is an object of this invention to provide a new and improved drywall mud storage and distribution system which is portable and capable of maintaining a large volume of drywall mud at a selected consistency for immediate application at at least one dispensing location.

Another object of the invention is to provide a drywall mud storage and distribution system which includes a drywall mud container and a pump mounted on a portable frame and connected by a flexible conduit to a pressure tank fitted with a mud-dispensing conduit system to facilitate dispensing of drywall mud at a selected dispensing point or points.

Still another object of this invention is to provide a new and improved drywall mud storage and distribution system which includes a frame mounted on wheels; a mud container mounted on the frame for mixing drywall mud in selected quantities; a pump also mounted on the frame for pumping drywall mud from the mud container through a flexible conduit to a portable pressure tank which may be included on or separate from the frame; a suitable pressure control system for automatically dispensing drywall mud from the mud container to the pressure tank responsive to a preselected pressure drop in the pressure tank; and a suitable dispensing conduit and valve system for dispensing drywall mud from the pressure tank to load a mud-dispensing apparatus such as a trigger-operated tape and mud dispensing apparatus responsive to depression of the application trigger on the apparatus.

A still further object of this invention is to provide a drywall mud storage and distribution system which is characterized by a portable frame; a mud container and pump mounted on the frame and a portable pressure tank provided separately from the frame and connected to the pump by a flexible conduit; and further including a second conduit system leading from the pressure tank and fitted with upper and lower valves. Drywall mud mixed and stored in the mud container is automatically transferred to the pressure tank through the flexible conduit by operation of the pump, and drywall mud of desired consistency is dispensed from the pressure tank through a pressure-sensitive lower valve to load a trigger-operated tape and mud dispensing device responsive to depression of an application trigger on the device. Drywall mud is also dispensed from the pressure tank to a mud dispensing tray on demand, by manual operation of the upper valve.

SUMMARY OF THE INVENTION

These and other objects of the invention are provided in a new and improved drywall mud storage and distribution system which includes in a preferred embodiment, a portable frame fitted with wheels and having a mud container and pump mounted thereon for dispensing drywall mud automatically from the mud container through the pump to a portable pressure tank having an internal diaphragm and connected to the pump by a flexible conduit and a pressure valve. The mud is dispensed on demand from the lower chamber of the pressure tank to a separate dispensing conduit system, upon which is typically mounted a tape and mud dispensing apparatus of selected design. This system facilitates dispensing of drywall mud from the pressure tank, through a pressure-sensitive valve provided in the lower portion of the conduit system. The pressure-sensitive valve operates responsive to depression of an application trigger on the mud dispensing apparatus and mud can also be delivered to an upper distribution point for filling a mud dispensing tray, by operation of a hand-operated valve in the upper portion of the conduit system.

BRIEF DESCRIPTION OF THE DRAWING

The invention will be better understood by reference to the accompanying drawings, wherein.

DESCRIPTION OF THE PREFERRED EMBODIMENTS

Figure 1:
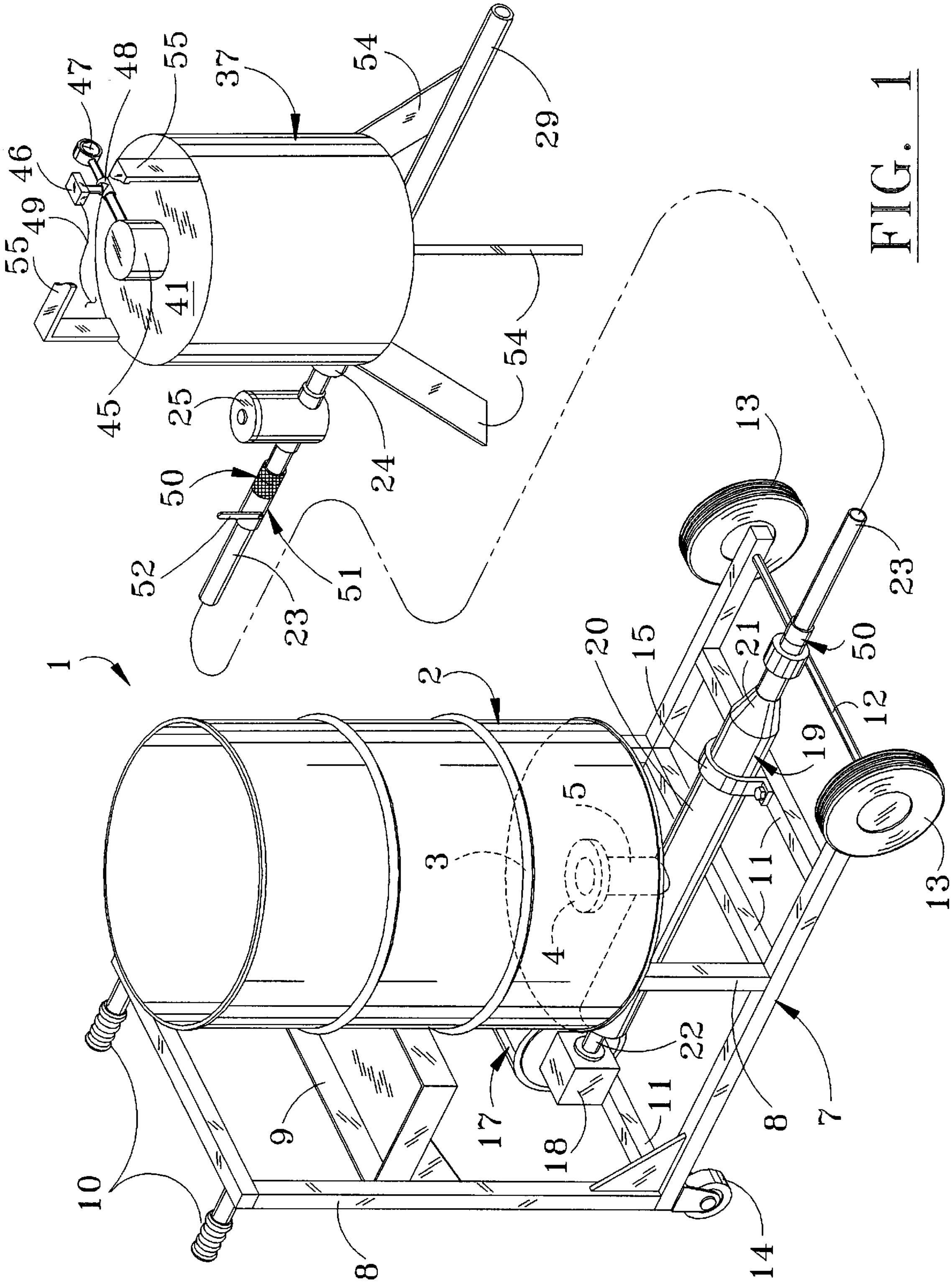
FIG. 1 is a perspective view of the mud container, pump and pressure tank components in a preferred embodiment of the drywall mud storage and distribution system of this invention.
Figure 2:
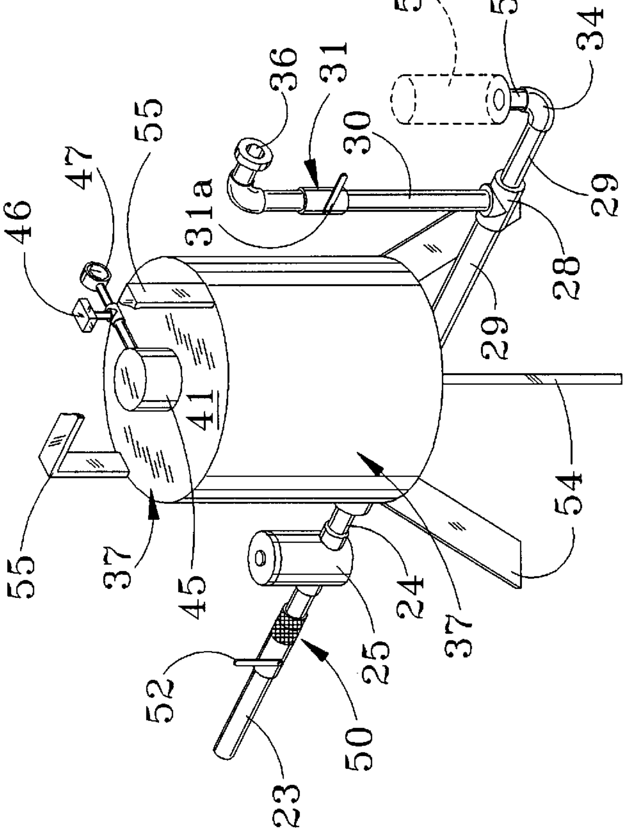
FIG. 2 is a perspective view of the pressure tank and dispensing conduit system components of the drywall mud storage and distribution system illustrated in FIG. 1.
Figure 3:
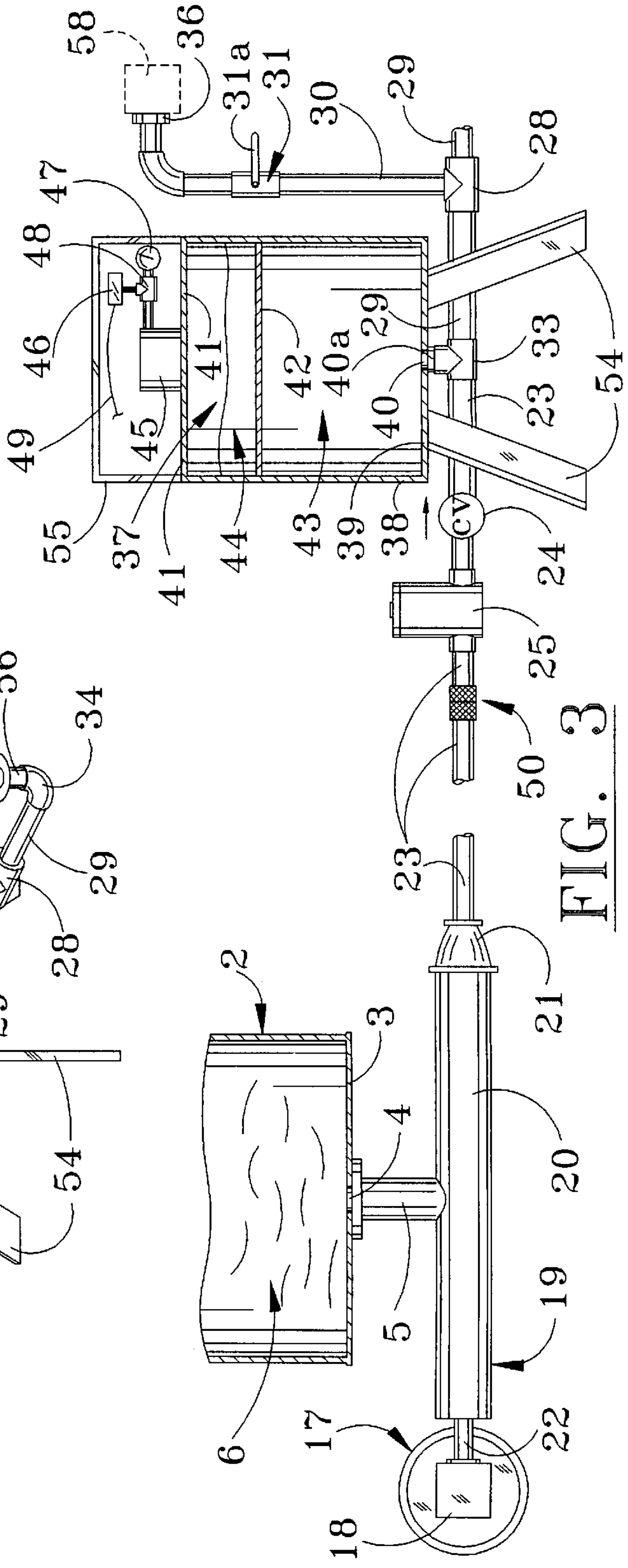
FIG. 3 is a sectional view of the mud container, pump and pressure tank components of the drywall mud storage and distribution system illustrated in FIGS. 1 and 2.

Referring to FIGS. 1–3 of the drawings, a preferred embodiment of the drywall mud storage and distribution system of this invention is generally illustrated by reference numeral 1. The drywall mud storage and distribution system 1 includes a frame 7, made portable by front wheels 13 and rear wheels 14, which front wheels 13 are typically mounted on an axle 12 and the rear wheels directly on the frame 7. Handles 10 are provided high on the frame 7 for gripping and directional control, and the pump housing 20 of a pump 19 extends across spaced-apart cross-braces 11, provided in the frame 7, and is secured in place by a clamp 15. An electric motor 17, provided with a gearbox 18, is also mounted in the frame 7 and the gearbox 18 is connected to the pump housing 20 by means of a drive shaft 22, as illustrated in FIGS. 1 and 3. The container bottom 3 of a mud container 2 is connected to the suction end of the pump 19 by means of a drain nozzle 5, which extends from the container drain 4 of the mud container 2 to the suction of the pump 19. Container supports 8 project upwardly from the horizontal portion of the frame 7 and rest against the container bottom 3 to support the mud container 2 on the frame 7. A supply tray 9 is attached to the vertical portion 8 of the frame 7 for carrying supplies, tools and equipment, as deemed necessary. A reducer 21 terminates the discharge end of the pump 19 and a flexible mud discharge line 23 extends from the reducer 21 to the run of a tee-connector 33, located beneath a pressure tank 37, as illustrated in FIG. 3. A quick-disconnect coupling 50, line strainer 25 and check valve 24 are optionally provided in the flexible mud discharge line 23, as further illustrated in FIG. 3. As illustrated in FIG. 1, an optional valve 51, fitted with a valve handle 52, may be provided in the pump segment of the mud discharge line 23, to retain pressure on this segment of the mud discharge line 23 and yet facilitate disconnection of the quick-disconnect coupling 50. The tee leg of the tee-connector 33 is connected to a drywall inlet 40, provided in the tank bottom 39 of a pressure tank 37, by means of an inlet nipple 40*a*, as further illustrated in FIG. 3. The pressure tank 37 is typically supported by legs 54 and may be provided with a tank handle 55 to facilitate movement of the pressure tank 37 to a location remote from the container 2 and frame 7, according to the length and flexibility of the mud discharge line 23. The remaining run end of the tee-connector 33 receives a lower feed line 29, into which is installed a tee 28, as illustrated in FIGS. 2 and 3. An upper feed line 30 projects upwardly from the tee leg of the lower valve 28, alongside the pressure tank 37 and terminates in a nozzle 36, as illustrated in FIG. 2. An upper valve 31, having an upper valve handle 31*a*, is mounted in the upper feed line 30 adjacent to the nozzle 36 to facilitate opening and closing the upper feed line 30 by manipulation of the upper valve handle 31*a*, for purposes hereinafter further described. The tank housing 38 of the pressure tank 37 includes a lower drywall mud chamber 43 and an upper captive air chamber 44, separated by a flexible diaphragm 42 and the tank top 41 is provided with a pressure fitting 45. The pressure fitting 45 accommodates a pressure tee 48, which receives a pressure switch 46, equipped with a pressure gauge 47, as further illustrated in FIGS. 1 and 3. Control wiring 49 extends from the pressure switch 46 to the electric motor 17, to energize the electric motor 17 responsive to reduction of air pressure in the captive air chamber 44 below a predetermined level determined by the setting of the pressure switch 46. The lower feed line 29 projects from the tee 28 and terminates in an elbow 34, which receives a pressure-sensitive lower valve 56, into which is typically inserted a tape and mud dispensing device 57, illustrated in phantom in FIG. 2. Accordingly, the drywall mud storage and distribution system 1 is operable to automatically fill the tape and mud dispensing device

57 or an alternative dispenser, with drywall mud 6 of selected consistency, contained in the mud container 2, as illustrated in FIG. 2. The tape and mud dispensing device 57 can then be removed from the lower valve 56 and used to "tape and float" the walls and ceilings (not illustrated) of a structure, in conventional fashion. As illustrated in FIGS. 2 and 3 of the drawings, a mud dispensing tray 58, illustrated in phantom in FIG. 3, can be positioned on or beneath the nozzle 36 of the upper feed line 30 to receive drywall mud from the upper feed line 30 by manipulation of the upper valve handle 31*a* of the upper valve 31, while the tape and mud dispensing device 57 is placed on the lower valve 56 and drywall mud selectively allowed to flow through the lower feed line 29, elbow 34 and lower valve 56, into the tape and mud dispensing device 57, as hereinafter described.

Referring again to FIGS. 1–3 of the drawings, when it is desired to use the drywall mud storage and distribution system 1, a quantity of powdered drywall mix (not illustrated) is dumped into the mud container 2, water is added and the mixture stirred to obtain a drywall mud 6 of desired consistency. A quantity of the drywall mud 6 is then transferred to the drywall chamber 43 of the pressure tank 37 by energizing the electric motor 17 and gearbox 18, which causes drywall mud 6 to flow through the container drain 4 of the mud container 2 and the drain nozzle 5, into the suction end of the pump 19. The pump 19 then pumps the drywall mud 6 through the reducer 21, the mud discharge line 23, the optional line strainer 25, check valve 24 and the tee-connector 33, and upwardly into the drywall chamber 43, through the drywall inlet 40 and inlet nipple 40*a*. This action forces the flexible diaphragm 42 upwardly and compresses the captive air in the closed air chamber 44 to a pressure level which is predetermined by the pressure setting in the pressure switch 46. When this preselected pressure is reached, it may be noted on the pressure gauge 47 and the pressure switch 46 automatically causes the electric motor 17 to stop, by terminating the electric current flow through the control wiring 49, according to the knowledge of those skilled in the art. The drywall mud 6 which has accumulated under pressure from the diaphragm 42 in the drywall chamber 43 is now dispersed to the tape and mud dispensing device 57, or to both the tape and mud dispensing device 57 and the mud dispensing tray 58, or to the mud dispensing tray 58 alone, as hereinafter described. The drywall mud 6 is caused to flow under pressure exerted by the diaphragm 42, from the drywall chamber 43 of the pressure tank 37 through the drywall inlet 40, the tee-connector 33, lower feed line 29 and the tee 28, and then through the elbow 34 and pressure-sensitive lower valve 56 and finally, into the tape and mud dispensing device 57, by depressing the application trigger (not illustrated) on the tape and mud dispensing device 57. When the tape and mud dispensing device 57 is sufficiently loaded with drywall mud 6, the application trigger is released, thereby terminating further flow of drywall mud 6 from the lower valve 56 into the tape and mud dispensing device 57, and the tape and mud dispensing device 57 is removed from the lower valve 56 and used to "tape and float" a structure in conventional manner. It will be appreciated that the lower valve 56 prevents drywall mud from flowing backward from the tape and mud dispensing device 57 into the lower feed line 29 and the drywall mud chamber 43 of the pressure tank 37. Furthermore, the check valve 24 prevents drywall mud from flowing back into the mud discharge line 23 when the tape and mud dispensing device 57 is being loaded.

Referring again to FIG. 3 of the drawings, the operator has the option of filling the tape and mud dispensing device 57 and/or the tape and mud dispensing device 57 and mud dispensing tray 58 with drywall mud at any time, when the drywall chamber 43 of the pressure tank 37 is loaded with drywall mud under pressure from the diaphragm 42 and the captive air in the captive air chamber 44. Accordingly, filling of the mud dispensing tray 58 with drywall mud is effected by opening the upper valve 31 by manipulating the upper valve handle 31*a*, thereby causing a quantity of drywall mud to flow from the drywall chamber 43 through the drywall inlet 40, the tee-connector 33 and lower feed line 29, as heretofore described for the tape and mud dispensing device 57, and upwardly through the tee 28 and upper feed line 30, into the mud dispensing tray 58, as illustrated in FIG. 3.

It will be appreciated by those skilled in the art that the drywall mud storage and distribution system of this invention offers a practical, portable and efficient device for dispensing drywall mud of selected uniform consistency over a long period of time to a variety of implements for applying drywall mud to a structure in any desired "taping and floating" operation. Furthermore, under circumstances where the mud discharge line 23 is sufficiently long to facilitate movement of the pressure tank 37 to any desired location, application of drywall mud is greatly expedited. Moreover, the quick-disconnect coupling 50 can be utilized to remove the pressure tank 37 from the frame 7 and mud container 2 elements of the drywall mud storage and distribution 1 for cleaning, replacement or repair purposes, as desired. In order to insure a high quality of drywall mud at the upper feed line 30 and the elbow 34, the line strainer 25 operates to separate lumps of unmixed drywall compound which may accumulate in the mud container 2 due to insufficient mixing of the dry powder component with water. Furthermore, the check valve 24, also located in the mud discharge line 23, prevents drywall mud stored under pressure in the drywall chamber 43 of the pressure tank 37 from flowing from the pressure tank 37 back through the mud discharge line 23 into the pump 19, as heretofore described.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A drywall mud storage and distribution system for loading a mud carrying or dispensing device with a supply of drywall mud, said drywall mud storage and distribution system comprising a container for containing a supply of drywall mud; pump means connected to said container for pumping drywall mud from said container; pressure tank means connected to said pump means for receiving a supply of drywall mud from said container; and valve means operably connected to said pressure tank means and adapted to be operably connected to the mud carrying or dispensing device, whereby drywall mud is dispensed from said container to said pressure tank means responsive to operation of said pump means and from said pressure tank means into the mud carrying or dispensing device responsive to operation of said valve means.

2. The drywall mud storage and distribution system of claim 1 comprising portable frame means supporting at least said container and said pump means.

3. The drywall mud storage and distribution system of claim 1 wherein said pump means comprises an electric motor and a pump having a suction end and a discharge end, said pump operably connected to said electric motor and wherein said container is connected to said suction end of said pump.

4. The drywall mud storage and distribution system of claim 1 wherein said pump means comprises an electric motor and a pump having a suction end and a discharge end, said pump operably connected to said electric motor and wherein said container is connected to said suction end of said pump and comprising a portable frame means supporting at least said container, said electric motor and said pump.

5. The drywall mud storage and distribution system of claim 1 comprising pressure control means operatively connected to said pressure tank means and said pump means, whereby said pump means is operated to pump drywall mud from said container into said pressure tank means responsive to a preselected reduction of pressure in said pressure tank means.

6. The drywall mud storage and distribution system of claim 5 comprising portable frame means supporting said container, said pump means and said pressure tank means.

7. The drywall mud storage and distribution system of claim 5 wherein said pump means comprises an electric motor and a pump having a suction end and a discharge end, said pump operably connected to said electric motor and wherein said container is connected to said suction end of said pump and said pressure control means is operatively connected to said electric motor.

8. The drywall mud storage and distribution system of claim 7 wherein said pressure control means comprises a pressure switch and a pressure gauge communicating with the interior of said pressure tank means and an electrical conduit connecting said pressure switch and said electric motor.

9. The drywall mud storage and distribution system of claim 1 wherein said pressure tank means comprises a pressure tank and a flexible diaphragm provided in the interior of said pressure tank, said flexible diaphragm dividing said interior into an air chamber and a drywall mud chamber.

10. The drywall mud storage and distribution system of claim 9 wherein said pressure control means comprises a pressure switch and a pressure gauge communicating with said air chamber of said pressure tank.

11. The drywall mud storage and distribution system of claim 10 wherein said pump means comprises an electric motor and a pump having a suction end and a discharge end, said pump operably connected to said electric motor and wherein said container is connected to said suction end of said pump and said pressure switch is operably connected to said electric motor.

12. The drywall mud storage and distribution system of claim 11 comprising portable frame means supporting said container, said electric motor and said pump.

13. The drywall mud storage and distribution system of claim 1 comprising a flexible mud discharge line connecting said pump means and said pressure tank means; a lower feed line extending from said flexible mud discharge line; and an upper feed line extending from said lower feed line upwardly adjacent to said pressure tank means and wherein said valve means comprises a lower valve provided in said lower feed line for directing drywall mud from said pressure tank means through said lower feed line to the mud dispensing device and comprising an upper valve provided in said upper feed line for selectively directing drywall mud from said pressure tank means through said upper feed line.

14. The drywall mud storage and distribution system of claim 13 comprising line strainer means provided in said flexible mud discharge line for filtering drywall mud flowing through said flexible mud discharge line.

15. The drywall mud storage and distribution system of claim 13 comprising a quick-disconnect coupling provided in said flexible mud discharge line for separating said pressure tank means from said container.

16. The drywall mud storage and distribution system of claim 13 comprising a tank handle carried by said pressure tank means for moving said pressure tank means independently of said container and said pump means.

17. The drywall mud storage and distribution system of claim 16 comprising:

(a) line strainer means provided in said flexible mud discharge line for filtering drywall mud flowing through said flexible mud discharge line; and (b) a quick-disconnect coupling provided in said flexible mud discharge time for separating said pressure tank means from said container.

18. The drywall mud storage and distribution system of claim 13 comprising a valve handle carried by said upper valve, whereby said upper valve is selectively manipulated into open and closed positions responsive to manipulation of said valve handle.

19. The drywall mud storage and distribution system of claim 18 comprising:

(a) a tank handle carried by said pressure tank means for moving said pressure tank means independently of said container and said pump means;

(b) line strainer means provided in said flexible mud discharge line for filtering drywall mud flowing through said flexible mud discharge line;

(c) a quick-disconnect coupling provided in said flexible mud discharge line for separating said pressure tank means from said container; and (d) a check valve provided in said flexible mud discharge line for preventing reverse flow of drywall mud through said flexible mud discharge line.

20. The drywall mud storage and distribution system of claim 13 comprising portable frame means supporting said container and said pump means.

21. The drywall mud storage and distribution system of claim 20 comprising pressure control means operatively connected to said pressure tank means and said pump means, whereby said pump means is operated to pump drywall mud from said container into said pressure tank means responsive to a preselected reduction of pressure in said pressure tank means.

22. The drywall mud storage and distribution system of claim 21 wherein said pump means comprises an electric motor and a pump having a suction end and a discharge end, said pump operably connected to said electric motor and said container is connected to said suction end of said pump and said pressure control means is operably connected to said electric motor.

23. The drywall mud storage and distribution system of claim 22 wherein:

(a) said pressure tank means comprises a pressure tank and a flexible diaphragm provided in the interior or said pressure tank, said diaphragm dividing said interior into an upper captive air chamber and a lower drywall mud chamber; and (b) said pressure control means comprises a pressure switch and a pressure gauge communicating with the interior of said upper air chamber and an electrical conduit connecting said pressure switch and said electric motor.

24. The drywall mud storage and distribution system of claim 23 comprising:

(a) a tank handle carried by said pressure tank for moving said pressure tank independently of said container;

(b) line strainer means provided in said flexible mud discharge line for filtering drywall mud flowing through said flexible mud discharge line;

(c) a quick-disconnect coupling provided in said flexible mud discharge line for separating said tank housing and said pressure tank from said container and said frame means; and (d) a check valve provided in said flexible mud discharge line for preventing reverse flow of drywall mud through said flexible mud discharge line.

25. The drywall mud storage and distribution system of claim 24 comprising a line valve provided in said mud discharge line between said quick-disconnect coupling and said pump for retaining line pressure in said mud discharge line when said quick-disconnect coupling is uncoupled.

26. A drywall mud storage and distribution system for loading a mud carrying or dispensing device with a supply of drywall mud, said drywall mud storage and distribution system comprising a portable frame; a container carried by said frame for containing drywall mud of selected consistency; a pump mounted on said frame, said pump communicating with said container for pumping drywall mud from said container; a motor mounted on said frame and operably connected to said pump for operating said pump; a mud discharge line extending from the discharge of said pump; a pressure tank having a flexible diaphragm in the interior thereof for dividing said interior into an upper closed air chamber and a lower drywall mud chamber and said mud discharge line communicating with said lower drywall mud chamber; a feed line extending from said mud discharge line and valve means provided in said feed line for dispensing drywall mud from said pressure tank through said feed line; and pressure control means operatively connected to said upper closed air chamber of said pressure tank and said pump, whereby said pump is operated to pump drywall mud from said container into said lower drywall mud chamber of said pressure tank responsive to a preselected reduction of pressure in said pressure tank and drywall mud is dispensed on demand from said feed line to the mud carrying or dispensing device.

27. A drywall mud storage and distribution system for loading a trigger-operated tape and mud dispensing device with a supply of drywall mud, said drywall mud storage and distribution system comprising a portable frame; a container carried by said frame for containing drywall mud of selected consistency; a pump mounted on said frame and communicating with said container for pumping drywall mud from said container and a motor mounted on said frame and operably connected to said pump for operating said pump; a flexible mud discharge line extending from the discharge of said pump; a pressure tank connected to said mud discharge line, said pressure tank having a flexible diaphragm in the interior thereof for dividing said interior into an upper closed air chamber and a lower drywall mud chamber and said flexible mud discharge line communicating with said lower drywall mud chamber, and a tank handle provided on said pressure tank for moving said pressure tank independently of said container and said pump; a lower feed line extending from said flexible mud discharge line and a pressure-sensitive lower valve provided in said lower feed line; an upper feed line extending from said lower feed line upwardly adjacent to said pressure tank and an upper valve provided in said upper feed line; and pressure control means operatively connected to said upper closed air chamber of said pressure tank and said pump, whereby said pump is operated to pump drywall mud from said container into said lower drywall mud chamber of said pressure tank responsive to a preselected reduction of pressure in said pressure tank, drywall mud is selectively dispersed through said lower feed line into the tape and mud dispensing device responsive to manipulation of the trigger of the device, and drywall mud is selectively dispersed through said upper feed line on demand, responsive to manipulation of said upper valve.

* * * * *